United States Patent
Redfield (10) Patent No.: US 8,982,369 B2
(45) Date of Patent: Mar. 17, 2015

(54) METHODS, SYSTEMS AND PROCESSOR-READABLE MEDIA FOR AUTOMATICALLY DETECTING DEVICE MOVEMENT IN A MANAGED SERVICE ENVIRONMENT

(71) Applicant: Xerox Corporation, Norwalk, CT (US)

(72) Inventor: Brian Redfield, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/626,007

(22) Filed: Sep. 25, 2012

(65) Prior Publication Data

US 2014/0085650 A1    Mar. 27, 2014

(51) Int. Cl.
| | | |
|---|---|---|
| G06F 3/12 | (2006.01) | |
| G06K 15/02 | (2006.01) | |
| H04L 29/12 | (2006.01) | |
| G06F 15/173 | (2006.01) | |
| G06F 15/16 | (2006.01) | |

(52) U.S. Cl.
CPC ............ G06K 15/02 (2013.01); H04L 61/2076 (2013.01)
USPC .......... 358/1.13; 358/1.15; 709/226; 709/229

(58) Field of Classification Search
CPC ....... G06K 15/02; G06K 15/18; G06K 15/40; H04M 11/04
See application file for complete search history.

(56) References Cited

U.S. PATENT DOCUMENTS

| | | | |
|---|---|---|---|
| 7,075,669 B2 | 7/2006 | Reddy | |
| 7,149,499 B1* | 12/2006 | Oran et al. ................. | 455/404.2 |
| 7,779,111 B2 | 8/2010 | Shiraiwa et al. | |
| 7,821,660 B2 | 10/2010 | Kitada | |
| 7,962,605 B2 | 6/2011 | Chen | |
| 8,001,270 B2 | 8/2011 | Ferlitsch | |
| 8,010,661 B2 | 8/2011 | Komine | |
| 2003/0005100 A1* | 1/2003 | Barnard et al. ............... | 709/223 |
| 2003/0093521 A1 | 5/2003 | Schlonski et al. | |
| 2003/0216143 A1 | 11/2003 | Roese et al. | |
| 2005/0002380 A1 | 1/2005 | Miller et al. | |
| 2007/0234354 A1* | 10/2007 | Hattori .......................... | 717/177 |
| 2008/0184162 A1* | 7/2008 | Lindsey et al. ............... | 715/783 |
| 2011/0037996 A1 | 2/2011 | DeRoller | |
| 2012/0072595 A1* | 3/2012 | St. Laurent et al. .......... | 709/226 |

* cited by examiner

*Primary Examiner* — Fred Guillermety
*Assistant Examiner* — Henok A Shiferaw
(74) *Attorney, Agent, or Firm* — Kermit D. Lopez; Luis M. Ortiz; Ortiz & Lopez, PLLC (57) ABSTRACT

Methods, systems and processor-readable media for automatically detecting movement of a device in a managed service environment. A device management software module can be configured to monitor a number of devices and retrieve traps from the device. A new Internet Protocol (IP) address with respect to the device on a subnet can be automatically updated by the device management software module if the device has changed location to ensure continual monitoring of the device. A notification indicative of the new IP address with respect to the device that has changed location can be sent to an administrator if the device management software module is not permitted to contact the new IP address. A notification indicative of a new device can also be sent to the administrator to determine if the device should be managed and monitored.

19 Claims, 4 Drawing Sheets

FIG. 4

METHODS, SYSTEMS AND PROCESSOR-READABLE MEDIA FOR AUTOMATICALLY DETECTING DEVICE MOVEMENT IN A MANAGED SERVICE ENVIRONMENT

TECHNICAL FIELD

Embodiments are generally related to data-processing methods, systems and processor-readable media. Embodiments are also related to multi-function devices such as printers, scanners, photocopy machines, and the like. Embodiments are additionally related to device management systems and techniques. Embodiments are further related to the detection of device movement in a managed service environment.

BACKGROUND OF THE INVENTION

A MFD (Multi-Function Device) is a rendering device such as an office machine that incorporates the functionality of multiple devices in a single apparatus or system, so as to offer a smaller footprint in a home or a small business setting, or to provide centralized document management/distribution/production in the context of, for example, a large-office setting. A typical MFD can provide a combination of some or all of the following capabilities: printer, scanner, photocopier, fax machine, e-mail capability, and so forth. Networked MFDs (Multi-Function Devices) generally interact with an assemblage of varying rendering devices, client computers, servers, and other components that are connected to and capable of communicating over a network.

During the lifecycle of a managed service contract, a MFD can change location causing the device IP address to also change, which may prevent management software from monitoring the status of the device. Failing to track the device can result in an inability to bill volume and meet SLA (Service Level Agreement) requirements based on consumable replenishment, which may result in a termination of the contract. Conventional techniques for obtaining new IP addresses are manual-based, resulting in hours spent tracking down information essential for billing and device monitoring.

Based on the foregoing, it is believed that a need exists for an improved method and system for automatically detecting the movement of a device such as a MFD in a managed service environment, as will be described in greater detail herein.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved method and system for managing a MFD.

It is another aspect of the disclosed embodiments to provide for improved methods, systems and processor-readable media for automatically detecting movement of a device (e.g., a MFD) in a managed service environment.

It is another aspect of the disclosed embodiments to provide improved methods, systems and processor-readable media for continuously monitoring a device such as a MFD.

The aforementioned aspects and other objectives and advantages can now be achieved as described herein. A method and system for automatically detecting movement of a device in a managed service environment is disclosed herein. A device management software module can be configured to monitor a number of devices and retrieve traps from the device. A new Internet Protocol (IP) address with respect to the device on a subnet can be automatically updated by the device management software module if the device has changed location to ensure continual monitoring of the device. A notification indicative of the new IP address with respect to the device that has changed location can be sent to an administrator if the device management software module is not permitted to contact the new IP address. A notification indicative of a new device can also be sent to the administrator to determine if the device should be managed and monitored. Such an approach continually monitors the devices during the lifecycle of a managed service contract thereby insuring uninterrupted notification of an error and cutting down a manual effort to locate and/or lost revenue for a missing device.

The device can be configured to notify a server of an error state and on startup via Simple Network Management Protocol (SNMP) traps. The device management module receives the notification with respect to the device and checks if it currently manages the device at that IP address. The device management module also checks whether the address is a valid address to contact and query the address for more detailed information such as, for example, MAC address and serial number and matches the new device with an existing device. If the device management module finds the match, it can update the existing record to ensure continual monitoring of the device. With the additional information gathered by the device management module, updates can be made to the existing device or notification can be provided for the device which has not previously been identified. The device management software module automatically detects the device that has changed location without rediscovering the device and alerts the administrator when the device has potential changed locations.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The disclosed embodiments are described in part below with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 1:
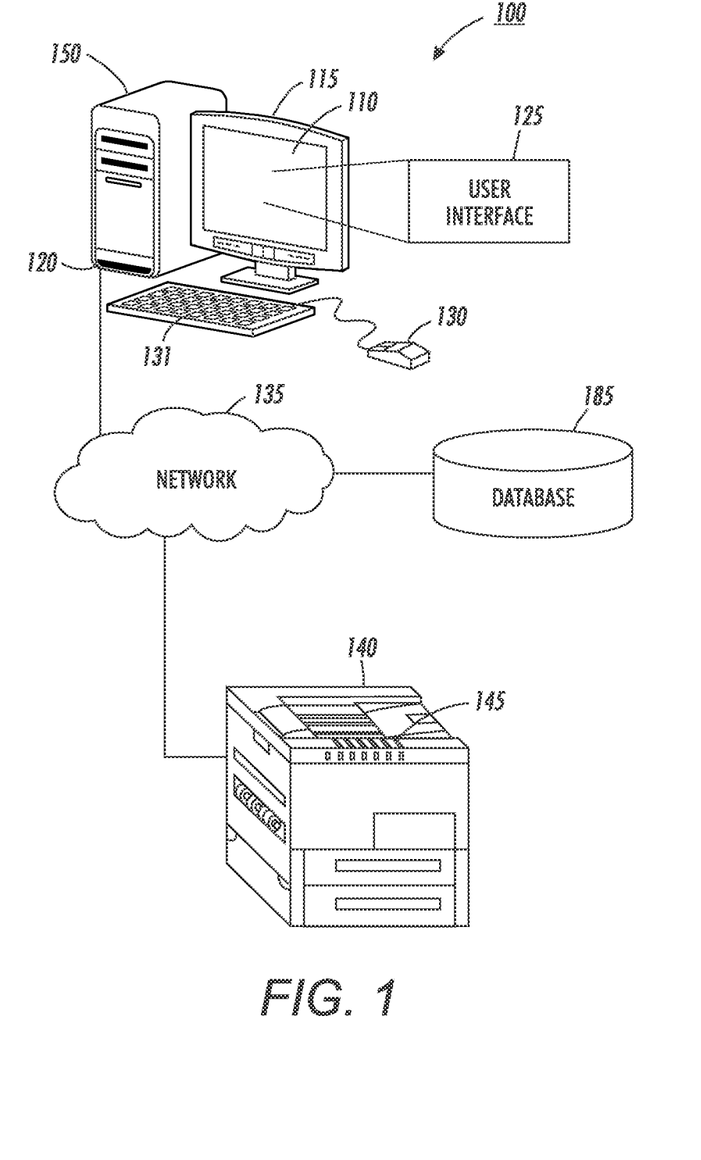
FIG. 1 illustrates an example of a multi-function device coupled to a data-processing apparatus through a network, in accordance with the disclosed embodiments.

Referring to FIG. 1, system 100 can be configured to include one or more networked devices, such as networked device 140, coupled to a data-processing apparatus 110 through a network 135. In some embodiments, networked device 140 may be a rendering device such as a printer, scanner, copy machine, etc. In other embodiments, networked device 140 may be a MFD, a file server, and/or a server. The data-processing apparatus 110 may be, for example, a personal computer or other computing device, and generally includes a central processor 120, a display device 115, a keyboard 131, and a pointing device 130 (e.g., mouse, track ball, pen device, or the like).

Note that as utilized herein, the term networked device may refer to an apparatus or system such as a printer, scanner, fax machine, copy machine, etc. and/or a combination thereof (e.g., a MFD). Preferably, networked device 140 is a MFD capable of multiple rendering functions such as printing, copying, scanning, faxing, etc. In some embodiments, the MFD 140 may be implemented with a single rendering function such as printing. In other embodiments, the MFD 140 can be configured to provide multiple rendering functions such as scanning, faxing, printing, and copying.

The data-processing apparatus 110 can be coupled to the MFD 140 (and other rendering devices) through a computer network 135. Network 135 may employ any network topology, transmission medium, or network protocol. The network 135 may include connections such as wire, wireless communication links, or fiber optic cables. In the depicted example, network 135 is the Internet representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational, and other computer systems that route data and messages.

The networked MFD 140 includes a user interface 145 such as a panel menu. The panel menu may be used to select features and enter other data in the device 140. Such interfaces may include, for example, touch screens having touch activated keys for navigating through an option menu or the like. A driver program, for example, can be installed on the data-processing apparatus 110 and can reside on the host device's hard drive 150. The driver program may be activated through an application interface so that a user may generate a rendering job with the driver for processing by the MFD 140.

The data-processing apparatus 110 also includes a GUI 125 for communicating rendering features for processing, for example, the rendering job to a user and accepting the user's selection of available rendering features. The user interface 125 displays information and receives data through device display and/or the keyboard/mouse combination. The interface 125 also serves to display results, whereupon the user may supply additional inputs or terminate a given session. The data-processing apparatus 110 can be, for example, any computing device capable of being integrated within a network such as a PDA, personal computer, cellular telephone, point-of-sale terminal, server, etc.

The input device of the networked device 140, for example, may be a local user interface 145 such as a touch-screen display or separate keypad and display or a memory fob or the like as discussed above. Alternatively or additionally, the input device may be a wireless port that receives a wireless signal containing constraint data from a portable device. The wireless signal may be an infrared or electromagnetic signal. A system administrator may input constraint data through the local user interface by manipulating the touch screen, keypad, or communicating via wireless messages through the wireless port. The administrator's portable device that communicates wirelessly may be a personal digital assistant (PDA), or the like, as noted above.

The following description is presented with respect to embodiments of the disclosed embodiments, which can be embodied in the context of the data-processing apparatus 110 and the networked device 140 depicted in FIG. 1. The disclosed embodiments, however, is not limited to any particular application or any particular environment. Instead, those skilled in the art will find that the system and methods of the disclosed embodiments may be advantageously applied to a variety of system and application software including database management systems, word processors, and the like. Moreover, the present invention may be embodied on a variety of different platforms including Macintosh, UNIX, LINUX, and the like. Therefore, the description of the exemplary embodiments, which follows, is for purposes of illustration and not considered a limitation.

Figure 2:
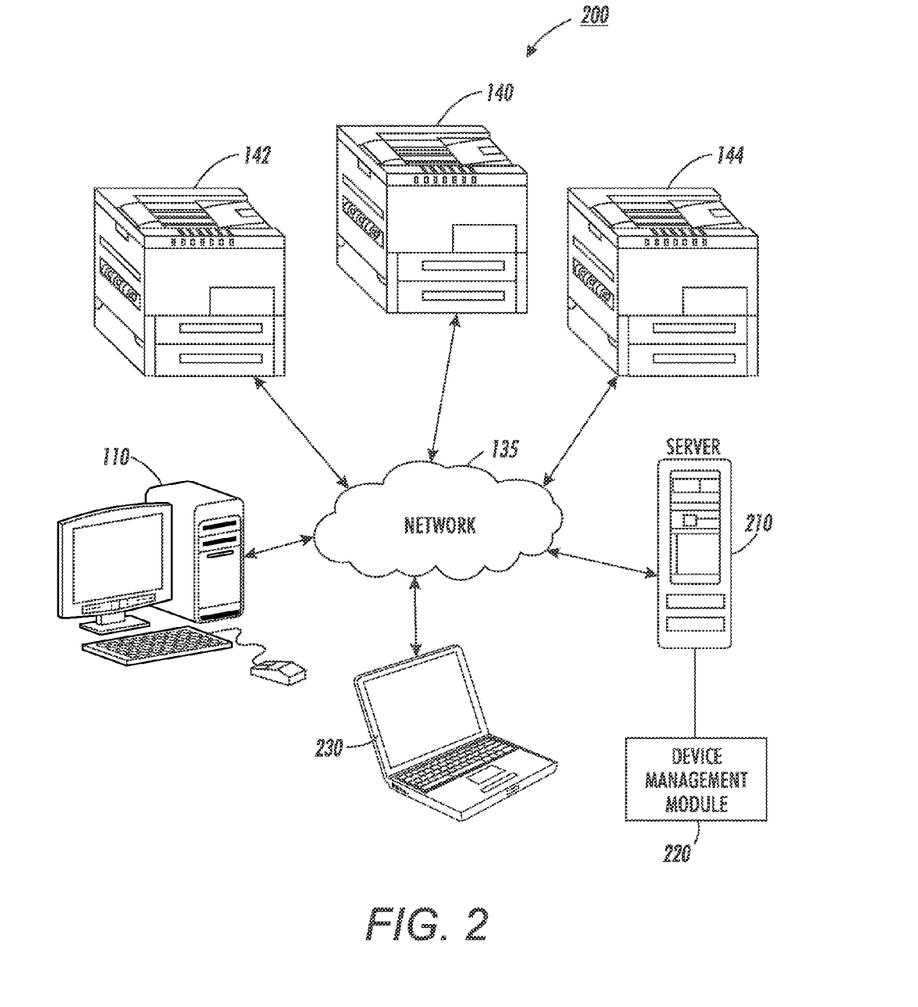
FIG. 2 illustrates a graphical representation of a device management system associated with a network, in accordance with the disclosed embodiments.

FIG. 2 illustrates a graphical representation of a device management system 200 associated with the network 135, in accordance with the disclosed embodiments. The device management system 200 generally includes a network infrastructure 135 associated with one or more networked MFDs 140, 142, and 144, data-processing system 110, a mobile communication device (e.g., a laptop) 230, and a server 210. Data-processing apparatus 110 depicted in FIG. 1 can be, for example, a server. Other devices such as, for example, desktops, network devices, palmtops, mobile phones, etc., may also be included in the network 135 as service providers. The MFDs 140, 142, and 144 can be located remotely with respect to each other, or alternatively, they may be located locally with respect to each other.

The typical MFD may act as a combination of a printer, scanner, photocopier, fax, and e-mail. While three MFDs 140, 142, and 144 are shown by way of example, it is to be appreciated that any number of MFDs may be linked to the network such as, four, six or more rendering devices. In general, the MFDs 140, 142, and 144 can be employed to perform a rendering output function (e.g., printing, scanning, copying, faxing, etc.) within a networked environment. Note that MFDs 140, 142, and 144 are generally analogous to one another.

A device management module 220 associated with the server 210 can be adapted for automatically detecting movement of the MFDs 140, 142, and 144 in a managed service environment. Note that as utilized herein, the term "module" may refer to a physical hardware component and/or to a software module. In the computer programming arts, such a software "module" may be implemented as a collection of routines and data structures that performs particular tasks or implements a particular abstract data type. Modules of this type are generally composed of two parts. First, a software module may list the constants, data types, variable, routines, and so forth that can be accessed by other modules or routines. Second, a software module may be configured as an implementation, which can be private (i.e., accessible only to the module), and which contains the source code that actually implements the routines or subroutines upon which the module is based.

Therefore, when referring to a "module" herein, the inventors are generally referring to such software modules or implementations thereof. The methodology described herein can be implemented as a series of such modules or as a single software module. Such modules can be utilized separately or together to form a program product that can be implemented through signal-bearing media, including transmission media and recordable media. The present invention is capable of being distributed as a program product in a variety of forms, which apply equally regardless of the particular type of signal-bearing media utilized to carry out the distribution.

Examples of signal-bearing media can include, for example, recordable-type media such as floppy disks, hard disk drives, CD ROMs, CD-Rs, etc., and transmission media such as digital and/or analog communication links. Examples of transmission media can also include devices such as modems, which permit information to be transmitted over standard telephone lines and/or the more advanced digital communications lines.

Figure 3:
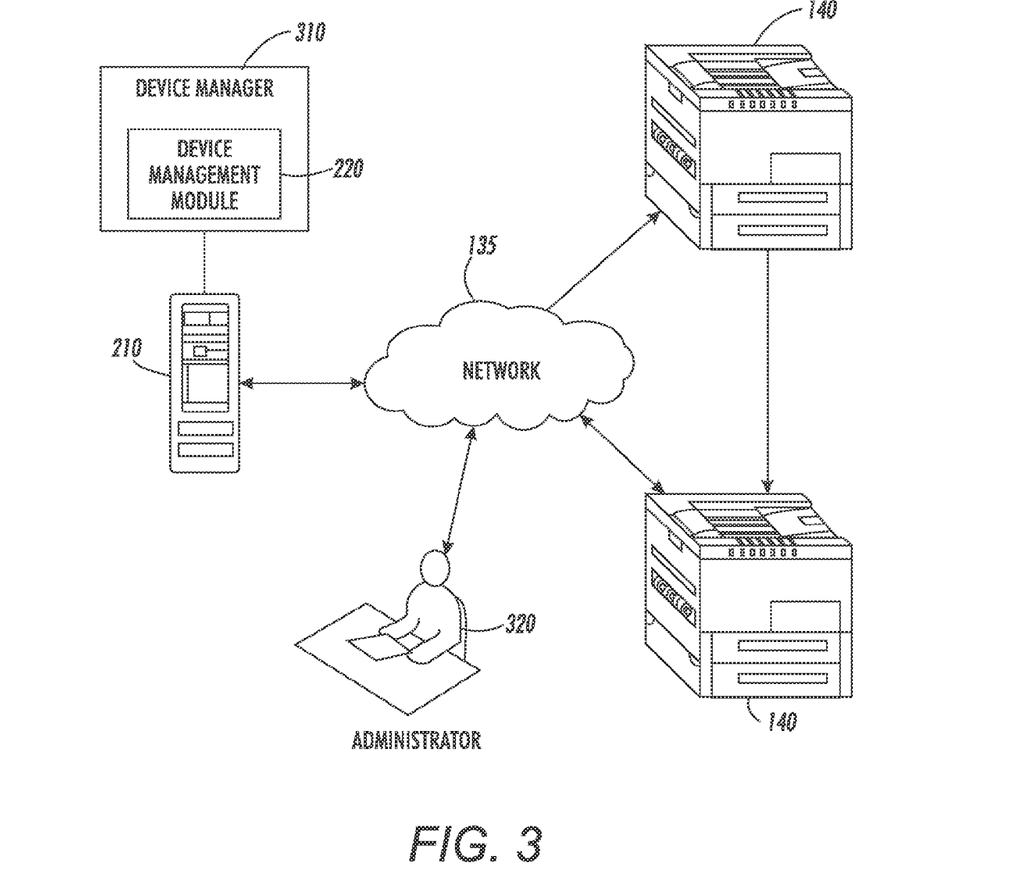
FIG. 3 illustrates a block diagram of the device management system associated with a device management module for detecting movement of a device, in accordance with the disclosed embodiments.

FIG. 3 illustrates a block diagram of the device management system 200 associated with the device management module 220 for detecting location of a device, in accordance with the disclosed embodiments. Note that in FIGS. 1-4, identical or similar blocks are generally indicated by identical reference numerals. The device management software module 220 associated with the device manager 310 can be configured to monitor a number of devices such as, for example, MFDs 140, 142, and 144 and retrieve traps from the devices. Note that the management software module 220 as utilized herein refers generally to a computer program or other module that interacts with a host application to provide a certain, usually very specific, function "on demand".

In general, the device manager 310 collects and manages the data that drives fact-based decisions for an enterprise device management environment. The device manager 310 is a single tool to install print queues and configure, manage, monitor, and report on both networked and locally connected devices. The device manager 310 includes a number of functions that can improve efficiency of document output environment and potentially reduce costs. These functions include device discovery, configuration and management, job tracking and visualization, proactive monitoring, remote diagnostics and troubleshooting, and reporting.

The device management software module 220 associated with the device manager 310 automatically updates a new Internet Protocol address (IP address) with respect to the MFD 140 on a subnet if the MFD 140 has changed location to ensure continual monitoring of the MFD 140. The MFD 140 can be configured to notify a server of error states and on startup via Simple Network Management Protocol (SNMP) traps. A trap is a one-way message from a network element such as a router, switch or server to the network management system.

The device management module 220 receives the notification with respect to the MFD 140 and checks if it currently manages the MFD 140 at that IP address. The device management module 220 also checks whether the address is a valid address to contact and query the address for more detailed information such as, for example, Media Access Control (MAC) address and serial number, and matches the new device to an existing device in the system 200. MAC address is a unique identifier assigned to network interfaces for communications on the physical network segment.

If the device management module 220 finds the match, it can update the existing record to ensure continual monitoring of the MFD 140. For example, if the MFD 140 resides in building 1 at an IP address 1.1.1.1 is moved to building 2 at an IP address 2.2.2.2 the device management software module 220 automatically updates the new Internet Protocol address (IP address) with respect to the MFD 140 to ensure continual monitoring of the device. A notification indicative of the new IP address with respect to the device 140 that has changed location can be sent to an administrator 320 if the device management software module 220 is not permitted to contact the new IP address. A notification indicative of a new device 140 can also be sent to the administrator 320 to determine if the device 140 should be managed and monitored. The system 200 improves revenue by continually managing all devices under contract and reduces labor cost by automatically tracking the devices that have changed location.

Figure 4:
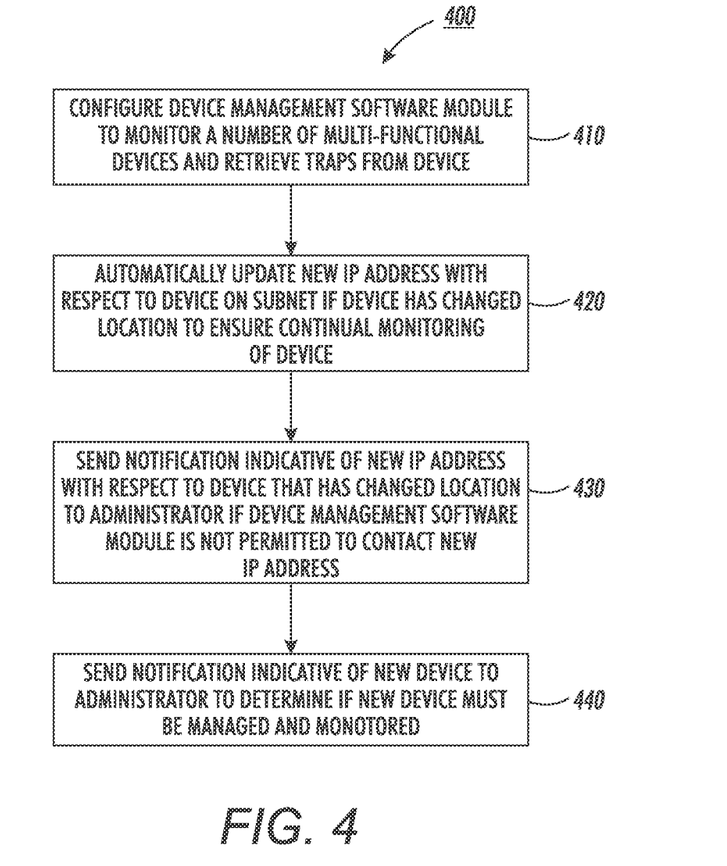
FIG. 4 illustrates a high level flow chart of operations illustrating logical operational steps of a method for automatically detecting movement of a device in a managed service environment, in accordance with the disclosed embodiments.

FIG. 4 illustrates a high level flow chart of operations illustrating logical operational steps of a method 400 for automatically detecting movement of a device in a managed service environment, in accordance with the disclosed embodiments. It can be appreciated that the logical operational steps shown in FIG. 4 can be implemented or provided via, for example, a module such as module 220 shown in FIG. 2. Initially, as indicated at block 410, the device management software module 220 can be configured to monitor a number of devices and retrieve traps from the device.

A new Internet Protocol address (IP address) with respect to the device on a subnet can be automatically updated by the device management software module 220 if the device has changed location to ensure continual monitoring of the device, as shown at block 420. Next, as shown at block 430, a notification indicative of the new IP address with respect to the device 140 that has changed location can be sent to the administrator 320 if the device management software module 220 is not permitted to contact the new IP address. A notification indicative of a new device can also be sent to the administrator 320 to determine if the device should be managed and monitored, as illustrated at block 440.

With the additional information gathered by the device management module 220, updates can be made to the existing device or notification can be provided for the device which has not previously been identified. The device management software module 220 automatically detects the device 140 that has changed location without rediscovering the device 140 and alerts the administrator 320 when the device 140 has potentially changed locations. The system 200 continually monitors the device 140 during the lifecycle of a managed services contract thereby insuring uninterrupted notification of errors and retrieve meters for accurate billing, cutting down manual efforts to locate, or lost revenue for missing devices.

Based on the foregoing, it can be appreciated that a number of embodiments, preferred and alternative, are disclosed herein. For example, a method for automatically detecting a movement of a device can be implemented. Such a method can include, for example, the steps or logical operations of automatically updating a new IP address with respect to a device among a plurality of devices if the device has changed location in order to ensure a continual monitoring of the device; transmitting a notification indicative of the new IP address with respect to the device that has changed location if a permission is not granted to contact the new IP address; and sending a notification indicative of a new device to provide a determination of whether or not the device among the plurality of devices requires management and monitoring. In some embodiments, the device may be a multi-function device or other device (e.g., rendering device). In another embodiment, a step or logical operation can be provided for automatically generating a notice from the device to a server indicative of an error state via a simple network management protocol trap.

In still another embodiment, steps or logical operations can be implemented for determining if the device is currently managed at the IP address and if the IP address comprises a valid address; querying the IP address for detailed information; matching the new device with an existing device among the plurality of devices; and updating an existing record to ensure continual monitoring of the device if the new device is matched.

In another embodiment, a step or logical operation can be implemented for updating the existing device and providing a notification for a device, which was not previously identified among the plurality of devices utilizing the detailed information with respect to the IP address. In yet another embodiment, steps or logical operations can be implemented for automatically detecting a device among the plurality of devices that has changed location without rediscovering the device; and generating an alert when the device has potentially changed location.

In other embodiments, a system for automatically detecting a movement of a device can be implemented. Such a system can include, for example, a processor; a data bus coupled to the processor; and a computer-usable medium embodying computer program code, the computer-usable medium being coupled to the data bus. The computer program code can include instructions executable by the processor and configured for: automatically updating a new IP address with respect to a device among a plurality of devices if the device has changed location in order to ensure a continual monitoring of the device; transmitting a notification indicative of the new IP address with respect to the device that has changed location if a permission is not granted to contact the new IP address; and sending a notification indicative of a new device to provide a determination of whether or not the device among the plurality of devices requires management and monitoring. In some system embodiments, the aforementioned device can be a multi-function device or other device (e.g., a rendering device, office equipment, etc.).

In other embodiments, the instructions can be further configured for automatically generating a notice from the device to a server indicative of an error state via a simple network management protocol trap. In other embodiments, the instructions can be further configured for determining if the device is currently managed at the IP address and if the IP address comprises a valid address; querying the IP address for detailed information; matching the new device with an existing device among the plurality of devices; and updating an existing record to ensure continual monitoring of the device if the new device is matched.

In yet another embodiment, the instructions can be further configured for the existing device and providing a notification for a device, which was not previously identified among the plurality of devices utilizing the detailed information with respect to the IP address. In still another embodiment, such instructions can be further configured for automatically detecting a device among the plurality of devices that has changed location without rediscovering the device; and generating an alert when the device has potentially changed location. In another embodiment, such instructions can be further configured for automatically generating a notice from the device to a server indicative of an error state via a simple network management protocol trap.

In another embodiment, a processor-readable medium storing code representing instructions to cause a process automatically detecting the movement of a device can be implemented. Such code can include, for example, code to automatically update a new IP address with respect to a device among a plurality of devices if the device has changed location in order to ensure a continual monitoring of the device; transmit a notification indicative of the new IP address with respect to the device that has changed location if a permission is not granted to contact the new IP address; and send a notification indicative of a new device to provide a determination of whether or not the device among the plurality of devices requires management and monitoring. In some embodiments, the aforementioned device may be a multi-function device or another device such as, for example, office equipment.

In another embodiment, such code can further include code to automatically generate a notice from the device to a server indicative of an error state via a simple network management protocol trap. In yet another embodiment, such code can further include code to determine if the device is currently managed at the IP address and if the IP address comprises a valid address; query the IP address for detailed information; match the new device with an existing device among the plurality of devices; and update an existing record to ensure continual monitoring of the device if the new device is matched.

In another embodiment, such code can include code to update the existing device and providing a notification for a device, which was not previously identified among the plurality of devices utilizing the detailed information with respect to the IP address. In still another embodiment, such code can include code to automatically detect a device among the plurality of devices that has changed location without rediscovering the device; and generate an alert when the device has potentially changed location.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for automatically detecting a movement of a moved device, said method comprising:
   configuring a device manager to automatically monitor a plurality of devices in a managed service environment and retrieve a trap from at least one device among said plurality of devices for use in detecting a movement of a moved device among said plurality of devices;
   automatically detecting said moved device without rediscovering said moved device utilizing said device manager;
   automatically updating a new IP address, media access address, and a serial number with respect to said moved device among said plurality of devices via said device manager;
   transmitting via said device manager a notification indicative of said new IP address, said media access address, and said serial number with respect to said moved device if a permission is not granted to contact said new IP address of said moved device;
   sending a notification indicative of said moved device and determining if said moved device among said plurality of devices requires management and continual monitoring;
   matching a new device with an existing device among said plurality of devices; and
   updating an existing record to ensure continual monitoring of said moved device if said new device is matched.

2. The method of claim 1 wherein said moved device comprises a multi-function device.

3. The method of claim 2 further comprising automatically generating a notice from said device to a server indicative of an error state via said trap, said trap comprising a one-way message from a network element to a network management system.

4. The method of claim 3 further comprising:
   determining if said device is currently managed at said IP address and if said IP address comprises a valid address;
   querying said IP address for detailed information.

5. The method of claim 4 further comprising updating said existing device and providing a notification for a device which was not previously identified among said plurality of devices utilizing said detailed information with respect to said IP address.

6. The method of claim 5 further comprising:
   generating an alert when said device has potentially changed location.

7. A system for automatically detecting a movement of a moved device, said system comprising:
   a device manager;
   a processor that communicates with said device manager;
   a data bus coupled to said processor; and
   a non-transitory computer-usable medium embodying computer program code, said computer-usable medium being coupled to said data bus, said computer program code comprising instructions executable by said processor and configured for:
   configuring said device manager to automatically monitor a plurality of devices and retrieve a trap from at least one device among said plurality of devices for use in detecting a movement of a moved device among said luralit of devices;
   automatically detecting said moved device without rediscovering said moved device via said device manager;
   automatically updating a new IP address, media access address, and serial number with respect to said moved device among said plurality of devices via said device manager;
   transmitting via said device manager a notification indicative of said new IP address, said media access address, and said serial number with respect to said moved device if a permission is not granted to contact said new IP address of said moved device;
   sending a notification indicative of said moved device and determining if said moved device among said plurality of devices requires management and continual monitoring;
   matching a new device with an existing device among said plurality of devices; and
   updating an existing record to ensure continual monitoring of said moved device if said new device is matched.

8. The system of claim 7 wherein said device comprises a multi-function device.

9. The system of claim 8 wherein said instructions are further configured to automatically generate a notice from said device to a server indicative of an error state via said trap, said trap comprising a one-way message from a network element to a network management system.

10. The system of claim 9 wherein said instructions are further configured for:
    determining if said device is currently managed at said IP address and if said IP address comprises a valid address;
    querying said IP address for detailed information.

11. The system of claim 10 wherein said instructions are further configured for updating said existing device and providing a notification for a device which was not previously identified among said plurality of devices utilizing said detailed information with respect to said IP address.

12. The system of claim 11 wherein said instructions are further configured for:
    generating an alert when said device has potentially changed location.

13. A non-transitory processor-readable medium storing code representing instructions to cause a process for automatically detecting the movement of a device, said code comprising code to:
    configure a device manager to automatically monitor a plurality of devices and retrieve a trap from at least one device among said plurality of devices for use in detecting a movement of a moved device among said plurality of devices;
    automatically detect said moved device without rediscovering said moved device utilizing said device manager;
    automatically update a new IP address, media access address, and a serial number with respect to said moved device among said plurality of devices via said device manager;
    transmit via said device manager a notification indicative of said new IP address, said media access address, and said serial number with respect to said moved device if a permission is not granted to contact said new IP address of said moved device;

send a notification indicative of said moved device and determining if said moved device among said plurality of devices requires management and continual monitoring;

match said new device with an existing device among said plurality of devices; and update an existing record to ensure continual monitoring of said moved device if said new device is matched.

14. The non-transitory processor-readable medium of claim 13 wherein said moved device comprises a multi-function device.

15. The non-transitory processor-readable medium of claim 14 wherein said code further comprises code to automatically generate a notice from said device to a server indicative of an error state via a simple network management protocol trap.

16. The non-transitory processor-readable medium of claim 15 wherein said code further comprises code to:

determine if said device is currently managed at said IP address and if said IP address comprises a valid address;

query said IP address for detailed information.

17. The non-transitory processor-readable medium of claim 16 wherein said code further comprises code to update said existing device and providing a notification for a device which was not previously identified among said plurality of devices utilizing said detailed information with respect to said IP address.

18. The non-transitory processor-readable medium of claim 17 wherein said code further comprises code to:

generate an alert when said device has potentially changed location.

19. The non-transitory processor-readable medium of claim 18 wherein said code further comprises code to automatically generate a notice from said device to a server indicative of an error state via said trap, said trap comprising a one-way message from a network element to a network management system.

* * * * *